United States Patent [19]

Sharples

[11] Patent Number: 5,204,980
[45] Date of Patent: Apr. 20, 1993

[54] RADIO RECEIVER SYSTEMS

[75] Inventor: Paul R. Sharples, Lancashire, England

[73] Assignee: The General Electric Company, p.l.c., England

[21] Appl. No.: 865,217

[22] Filed: Apr. 9, 1992

[30] Foreign Application Priority Data

Apr. 15, 1991 [GB] United Kingdom ............... 9107919

[51] Int. Cl.$^5$ .............................................. H04B 7/08
[52] U.S. Cl. .................................. 455/277.1; 455/135
[58] Field of Search ............... 455/277.1, 277.2, 278.1, 455/283, 284, 133, 134, 135, 47; 375/43, 40, 100

[56] References Cited

U.S. PATENT DOCUMENTS 2,504,341  4/1950  Matthews .......................... 455/135
4,696,058  9/1987  Tachita et al. ................... 455/277.1

FOREIGN PATENT DOCUMENTS 0227458  7/1987  European Pat. Off. .
537937   7/1941  United Kingdom .
2178269  2/1987  United Kingdom .

Primary Examiner—Reinhard J. Eisenzopf
Assistant Examiner—Nguyen Vo
Attorney, Agent, or Firm—Kirschstein, Ottinger, Israel & Schiffmiller

[57] ABSTRACT

A radio receiver system for receiving double sideband signals from a plurality of antennas (N1,N2) having different reception characteristics detects a reduction in power in one of the sidebands of a received signal, due to multiple path reception or other disturbances. The system then selects for use by the receiver a signal from an antenna less affected by the disturbances.

5 Claims, 2 Drawing Sheets

RADIO RECEIVER SYSTEMS

This invention relates to radio receiver systems and, more especially, to radio receiver systems using mobile receivers.

A common problem with radio reception using mobile receivers is fading due to multiple path reception. This arises when a transmitted signal reaches a receiving antenna via two or more paths, when it is reflected from surfaces such as mountains, buildings or other vehicles. These signals will arrive at the receiving antenna with different phases owing to the different length of the paths travelled by the signal. For any given path geometry, there will be certain frequencies at which cancellation occurs when the vector sum of all the incident signal fields at the receiving antenna is zero. This situation is often referred to as a 'null'. As the receiver moves, so the lengths of the paths travelled by the signal vary and thus the frequencies at which cancellation occurs also change. Repeated momentary disturbances of reception are then experienced whenever a nulled frequency coincides with that being used by the receiver.

One solution to this problem is to use a diversity reception technique. In this technique, an antenna arrangement comprising two or more antennas having different reception characteristics, (i.e. having receiving-polar diagrams of different shape and/or orientation) is used. The system is provided with a switching arrangement whereby the antenna producing the best signal at any one time is selected as the receiver antenna.

In order to operate such a selection process, it is necessary that the system incorporate some means to detect disturbance of a signal, preferably at a degree of disturbance less than that which significantly degrades the usefulness of the signal. For this purpose, multiple path disturbances can be divided into two types. Above and below each frequency which experiences total cancellation or nulling, there is a continuous range of frequencies which are significantly attenuated. The width of this frequency range is a function of the geometry of the various paths. In one type of null, known as a broadband null, the range of attenuated frequencies is large in the sense that it is at least a significant fraction of the total bandwidth of the transmitted radio signal. In such a case, the signal power detected by the receiver is significantly reduced, an effect which is easily detected. If the range of frequencies in the null is greater than the signal bandwidth, the effect is indistinguishable from simple blockage of the transmitted signal. In the second type of null, known as a narrow bandwidth null, the range of attenuated frequencies is narrow relative to the signal bandwidth. The loss of signal is then small, and in extreme cases, negligible relative to the usual fluctuations experienced with a mobile receiver. The distortion of the signal frequency spectrum, however, results in noise and distortion in the demodulated signal which can reduce the usefulness just as severely as the simple attenuation suffered in the broadband null. This second type of null is considerably more difficult to detect in analogue systems, such as the public broadcast services, which do not allow the use of digital error-checking algorithms.

It will be appreciated that the distinction between broadband and narrowband nulls is artificial, and that nulls in general will have frequency widths such that they exhibit the behaviour characteristics of both types of null.

It is an object of the present invention to provide a radio receiver system which overcomes the above described problems with narrowband nulls.

According to the present invention there is provided a radio receiver system comprising a radio receiver for receiving double sideband signals, a switching arrangement arranged to connect an antenna terminal of the receiver to a selected one of at least two signals produced by antennas having different reception characteristics, and control means for controlling the operation of the switching arrangement in dependence on a signal at the antenna terminal of the receiver to which the receiver is tuned, characterised in that said control means controls the operation of said switching arrangement in dependence on the difference in power in the two sidebands of said signal.

The control means suitably operates said switching arrangement when said difference in power exceeds a predetermined value which may be a predetermined proportion of the total power in both sidebands.

Alternatively the control means may operate the switching arrangement when the rate of change of said difference with time exceeds a predetermined value.

The switching arrangement suitably operates to connect said antenna terminal to a different one of said signals each time it is operated by said control means.

One radio receiver system in accordance with the invention will now be described by way of example with reference to the accompanying drawings in which.

Figure 1:
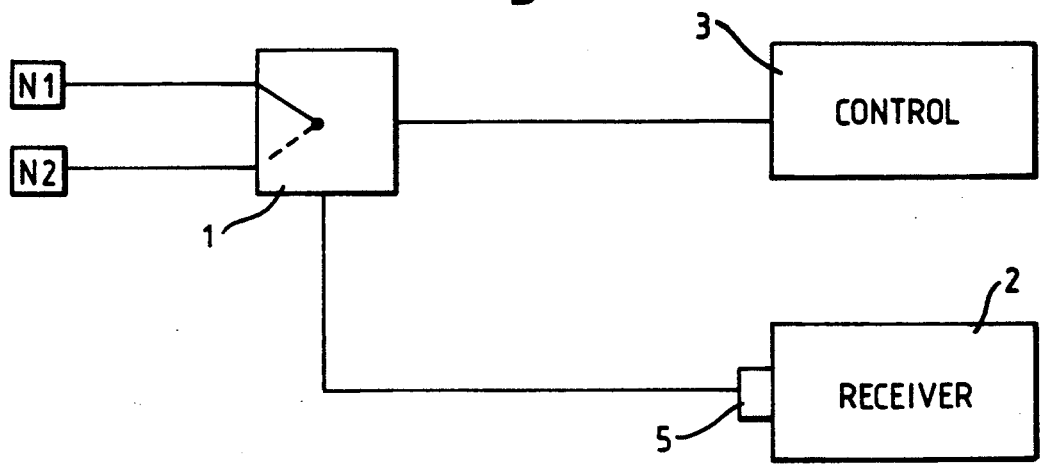
FIG. 1 is a diagrammatic illustration of the system.

Referring to FIG. 1, the system includes a radio receiver 2 adapted to receive double sideband signals, for example conventional amplitude modulated signals, from either one of two antennas N1 and N2 having different reception characteristics. To this end, the antenna terminal 5 of the receiver 2 is connected to the antennas N1,N2 via a switching circuit 1 whose operation is controlled by a circuit 3 which in turn is controlled by a signal derived from the receiver 2, as further described below.

The switching circuit 1 serves to connect the antenna terminal 5 either to the antenna N1 or the antenna N2.

Figure 2A:
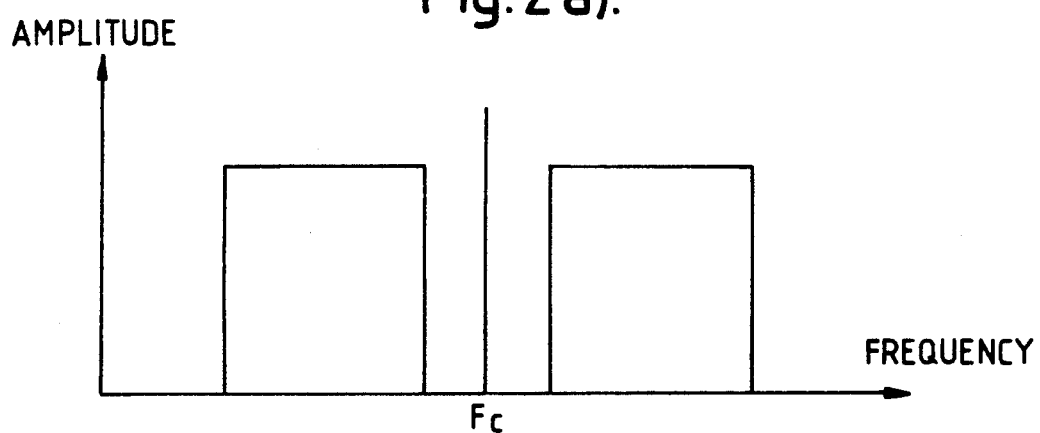
FIG. 2A and 2B are diagrams illustrating the spectrum of an amplitude modulated signal a) as transmitted and b) as received, the upper sideband being affected by a null.
Figure 2B:
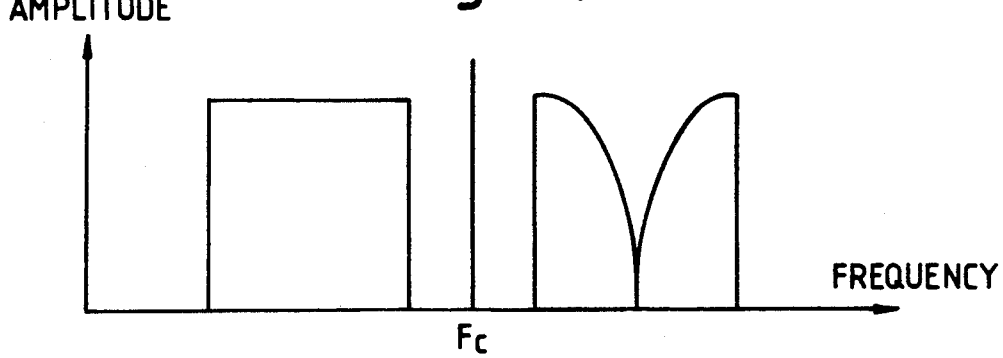

In operation, the control circuit 3 utilises the signal fed to it by the receiver 2 to determine when the power in the two sidebands of a signal applied to the receiver antenna terminal 5 to which the receiver 2 is tuned differs significantly, e.g. due to a null in a sideband as illustrated in FIG. 2(b), and when it does, operates the switching circuit 1 so as to connect the other antenna to the receiver antenna terminal 5. Thus the antenna terminal 5 of the receiver 2 remains connected to one of the antennas so long as the power in the sidebands of the signal at the receiver antenna terminal 5 remains substantially equal as illustrated in FIG. 2(a) and, if this ceases to be the case, switches from one antenna to the other until power equality of the sidebands is restored.

Figure 3:
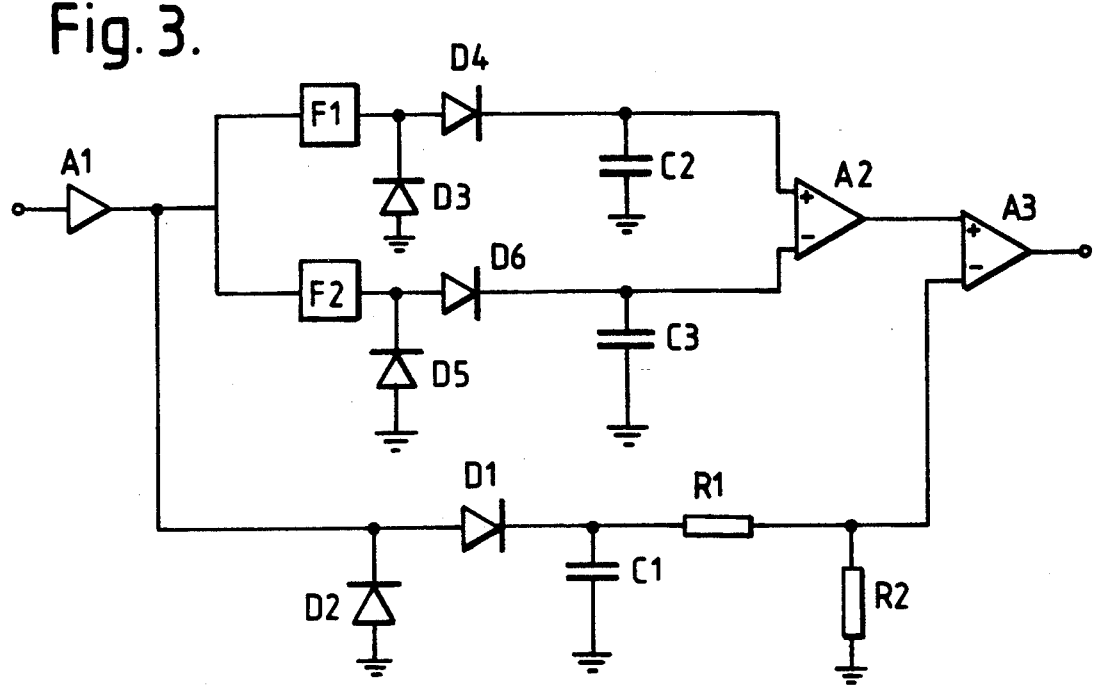
FIG. 3 is a circuit diagram of part of the system of FIG. 1.

The circuit of one particular embodiment of the control circuit is illustrated in FIG. 3.

A signal containing both sidebands of an amplitude modulated radio frequency signal to which the receiver 2 is tuned is applied in the control circuit 3 via an amplifier A1 to two filter circuits F1,F2 which serve to separate out the two sideband components. The outputs of the filters F1,F2 are then applied to separate rectifying and smoothing circuits comprising diodes D3 and D4, D5 and D6 and capacitors C2 and C3, to produce voltages representative of the power in the two sidebands. These voltages are applied to respective inputs of an operational amplifier A2 to produce a voltage representative of the difference of power in the two sidebands. The power difference voltage is then applied to one input of a comparator A3, to whose other input there is applied a reference voltage so that the comparator A3 produces an output indicative as to when the power difference exceeds a value set by the value of the reference voltage, the appearance of such output causing the switching circuit 1 to operate.

The reference voltage may be a fixed value, or may be variable in some way. For example, it may have a value representative of the total power in the two sideband components in the signal applied to the control circuit. Such a signal may be produced, for example, as illustrated in FIG. 3 by rectifying and smoothing the signal at the output of amplifier A1 by means of diodes D1,D2 and capacitor C1 and applying a fraction of the output voltage to the comparator A3 by way of a voltage divider comprising resistors R1 and R2.

The signal applied to the input of the control circuit 3 may be a signal at the frequency of the r.f. signal applied to the receiver antenna terminal 5, or where the receiver 2 is a superheterodyne receiver, at the frequency of an intermediate frequency used in the receiver 2.

To detect increasing distortion at an earlier stage, the output of the operational amplifier A2 may be differentiated with respect to time by connecting a differentiating amplifier circuit between the operational amplifier A2 and the comparator A3.

It will be understood that the invention is applicable to any system incorporating a receiver adapted to receive double sideband signals.

Thus the invention is applicable for example to systems wherein information is received as amplitude modulation of a sub-carrier and the modulated sub-carrier is transmitted as modulation of a main carrier. Thus the invention is applicable to systems for receiving stereo sound signals of the format employed in the VHF waveband in the United Kingdom.

In this stereo broadcasting system, a left and right channel difference signal (L-R) is amplitude modulated onto a sub-carrier having a frequency $F_C$ and the resulting signal is added to a left and right channel sum signal (L+R) to form a composite signal which is transmitted as frequency modulation of a main radio frequency carrier.

Figure 4:
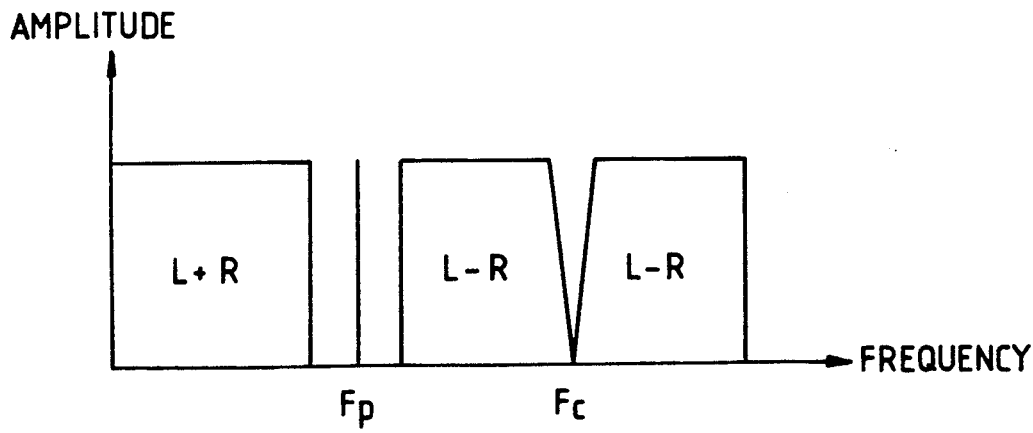
FIG. 4 is a diagram illustrating the spectrum of a stereo sound broadcast signal after demodulation.

Referring to FIG. 4, which shows the spectrum of the composite signal, the sub-carrier $F_C$ is suppressed and a pilot of frequency $F_P$ half the frequency $F_C$ is transmitted along with the composite signal.

If the symmetry of the sidebands of the sub-carriers is destroyed, e.g. due to a narrowband null, a radio receiver system according to the present invention will detect the lack of symmetry by monitoring the received signal either before or after demodulation of the received signal. However, since the frequency separation of the difference signal sub-carrier sidebands relative to the sub-carrier frequency $F_C$ is much larger than the frequency separation of the transmission carrier sidebands relative to the transmission carrier frequency, it is easier to separate the sidebands after the transmitted signal has been demodulated.

It will be appreciated that the invention is applicable to a system incorporating receivers adapted to receive frequency modulated signals as well as systems incorporating receivers adapted to receive amplitude modulated signals.

I claim:

1. A radio receiver system comprising: a radio receiver for receiving double sideband signals applied to an antenna terminal of the receiver; at least two antennas having different reception characteristics; a switching arrangement arranged to connect the antenna terminal of the receiver to a selected one of the antennas; and control means for controlling the operation of the switching arrangement in dependence on the difference in power in the two sidebands of a signal at said antenna terminal.

2. A system as claimed in claim 1, in which said control means comprises means for operating said switching arrangement when the said difference in power exceeds a predetermined value.

3. A system as claimed in claim 2, in which said control means comprises means for operating said switching arrangement if said difference in power exceeds a predetermined proportion of the total power in both sidebands.

4. A system as claimed in claim 1, in which said control means comprises means for operating said switching arrangement when said difference has a rate of change with time exceeding a predetermined value.

5. A system according to claim 1 wherein said switching arrangement comprises means for connecting said antenna terminal to a different one of said antennas each time it is operated by said control means.

* * * * *